US011146523B2

(12) United States Patent
Melamed

(10) Patent No.: US 11,146,523 B2
(45) Date of Patent: Oct. 12, 2021

(54) SYSTEM AND METHOD FOR LOCATING A MINYAN

(71) Applicant: David Melamed, Ridgewood, NY (US)

(72) Inventor: David Melamed, Ridgewood, NY (US)

( * ) Notice: Subject to any disclaimer, the term of this patent is extended or adjusted under 35 U.S.C. 154(b) by 0 days.

(21) Appl. No.: 16/574,738

(22) Filed: Sep. 18, 2019

(65) Prior Publication Data

US 2020/0092244 A1 Mar. 19, 2020

Related U.S. Application Data

(60) Provisional application No. 62/732,614, filed on Sep. 18, 2018.

(51) Int. Cl.
| G06F 15/16 | (2006.01) |
| G06F 9/54 | (2006.01) |
| H04L 29/06 | (2006.01) |
| H04L 12/58 | (2006.01) |
| H04L 12/18 | (2006.01) |

(52) U.S. Cl.
CPC .......... *H04L 51/20* (2013.01); *H04L 12/1845* (2013.01); *H04L 12/1881* (2013.01)

(58) Field of Classification Search
CPC ............................ G06Q 10/1095; H04L 51/20
USPC ......................................................... 709/206
See application file for complete search history.

(56) References Cited

U.S. PATENT DOCUMENTS

| 6,639,139 | B2 | 10/2003 | Muller |
| 8,390,204 | B1 | 3/2013 | Zagha |
| 8,516,068 | B2 | 8/2013 | Brown et al. |
| 9,049,238 | B2 | 6/2015 | Scuba et al. |
| 9,355,387 | B1* | 5/2016 | Dixon ..................... G06Q 50/01 |
| 9,357,350 | B2 | 5/2016 | Scuba et al. |
| 2006/0043728 | A1* | 3/2006 | Perelman ............... B42D 5/042 283/3 |
| 2006/0045030 | A1* | 3/2006 | Bieselin .............. H04L 12/1818 370/260 |
| 2007/0132166 | A1 | 6/2007 | Andres |
| 2008/0243605 | A1* | 10/2008 | Burger ............... G06Q 30/0242 705/14.16 |
| 2009/0100037 | A1* | 4/2009 | Scheibe .............. G06F 16/9537 |
| 2009/0287562 | A1* | 11/2009 | Bosch ................... G07F 19/207 705/14.27 |
| 2010/0250321 | A1* | 9/2010 | Farrell ............... G06Q 10/1095 705/7.19 |
| 2010/0257014 | A1* | 10/2010 | Roberts ................ G06Q 10/109 705/7.19 |

(Continued)

FOREIGN PATENT DOCUMENTS

| WO | 2005114377 A1 | 12/2005 |
| WO | 2015050585 A1 | 4/2015 |
| WO | 2016141429 A1 | 9/2016 |

*Primary Examiner* — Hamza N Algibhah
(74) *Attorney, Agent, or Firm* — Gearhart Law LLC; David Postolski, Esq.

(57) ABSTRACT

A method and system for organizing a quorum is provided. The method includes requesting, using an application on an electronic device, the formation of a quorum at a predetermined geographic location, identifying a plurality of individuals within that predetermined geographic location, and sending a notification to a secondary electronic device for each of the plurality of individuals, wherein the notification notifies each of the plurality of individuals of the predetermined geolocation of the quorum.

10 Claims, 3 Drawing Sheets

(56) References Cited

U.S. PATENT DOCUMENTS

| | | | |
|---|---|---|---|
| 2010/0317392 A1* | 12/2010 | Davis | H04L 67/18 |
| | | | 455/518 |
| 2011/0041084 A1* | 2/2011 | Karam | G06Q 10/10 |
| | | | 715/753 |
| 2012/0005293 A1 | 1/2012 | Brown et al. | |
| 2012/0136689 A1* | 5/2012 | Ickman | G06Q 50/01 |
| | | | 705/7.19 |
| 2012/0161971 A1* | 6/2012 | Nasir | G07C 1/10 |
| | | | 340/573.4 |
| 2013/0198281 A1* | 8/2013 | Scuba | H04W 12/02 |
| | | | 709/204 |
| 2013/0259216 A1* | 10/2013 | Adzhamyan | H04M 3/432 |
| | | | 379/201.02 |
| 2013/0316735 A1* | 11/2013 | Li | H04W 4/029 |
| | | | 455/456.3 |
| 2014/0188541 A1* | 7/2014 | Goldsmith | H04L 67/306 |
| | | | 705/7.19 |
| 2015/0381662 A1* | 12/2015 | Nair | H04L 63/205 |
| | | | 726/1 |
| 2016/0042282 A1* | 2/2016 | Amini | G06Q 30/02 |
| | | | 706/46 |
| 2016/0086137 A1* | 3/2016 | Ackerman | G06Q 50/01 |
| | | | 705/7.19 |
| 2016/0212076 A1 | 7/2016 | Bellissimo et al. | |
| 2016/0314695 A1* | 10/2016 | Haider | G06Q 10/101 |
| 2017/0050081 A1* | 2/2017 | Jones | G07F 17/3225 |
| 2017/0076348 A1* | 3/2017 | Jennings | G06F 3/0482 |
| 2017/0300583 A1* | 10/2017 | Chun | G06F 16/9535 |
| 2017/0351770 A1* | 12/2017 | Ahn | G06Q 50/01 |
| 2018/0101760 A1* | 4/2018 | Nelson | G06N 5/04 |
| 2018/0101823 A1* | 4/2018 | Nelson | H04N 7/155 |
| 2018/0365302 A1* | 12/2018 | Tabun | G06F 16/2455 |

* cited by examiner

SYSTEM AND METHOD FOR LOCATING A MINYAN

CROSS REFERENCE TO RELATED APPLICATION

This application is related to and claims the benefit of U.S. Provisional Patent Application Ser. No. 62/732,614 filed Sep. 18, 2018 which is incorporated by reference herein in its entirety for all purposes.

FIELD OF THE EMBODIMENTS

This invention relates to organizing groups of individuals and, in particular, to identifying appropriate members of a quorum and facilitating the formation of such a quorum.

BACKGROUND OF THE EMBODIMENTS

For many religious activities, certain preconditions must be met before the activities may begin. For example, for certain religious obligations in the Jewish faith, a quorum of individuals must be present before the activities associated with the religious obligation may commence. This religious obligation may be, e.g., a public prayer. Such a prayer cannot commence without the necessary number of individuals present.

Typically, the members of the quorum must meet certain qualifications. Therefore, for a quorum to be successfully created, the members of the quorum must find other qualifying members. This process can be difficult at times, since it is not always clear who qualifies to belong in the quorum.

Therefore, an easy and efficient system and method for determining who belongs in a particular quorum and for setting up such a quorum is needed.

Examples of related art are described below:

U.S. Pat. No. 6,639,139 generally describes a visually enhanced teaching text that comprises a series of words to be sung, the series of words having a plurality of tropes each having a predetermined tune. The text also includes symbols in the text indicative of the start and end of a trope, with at least some of the tropes being associated with a particular distinctive color so that each trope in the series of words is clearly distinguishable from surrounding tropes therein.

U.S. Pat. No. 8,390,204 generally describes a memorial display system including at least one memorial device having a plurality light fixtures with each light fixture having at least one light source. Each of the light sources are in electrical communication with a controller circuit that automatically activates and deactivates the at least one light source of each light fixture according to at least one anniversary date and for a duration period stored in the memory. In one embodiment, each light source is part of a light bar with up to 5 lights. The light bars are commonly strung together to create various runs of lighting opportunities allowing for different overall sizes of the automated memorial system.

U.S. Pat. No. 8,516,068 generally describes a system and method for processing messages being composed by a user of a computing device (e.g. a mobile device). Embodiments are described in which the performance of certain tasks is initiated before a direction is received from a user to send a message being composed by the user. This may involve, for example, "pre-fetching" security-related data that will be required in order to send a message that is in the process of being composed by the user securely. Such data may include security policy data, certificate data, and/or certificate status data, for example.

U.S. Pat. No. 9,049,238 generally describes a system for creating an anonymous social gathering of 3 or more persons. The system has a server digital device and a client digital device both operatively connected to a distributed network and thus to each other. The client device is configured to display an electronic mapping received from the server digital device through the distributed network and the electronic mapping displays at least one selectable geolocation indicator. Each geolocation indicator represents an indicated location of a gathering of at least two anonymous portable digital devices. The electronic mapping is configured to display indicator identification information on the user device for the momentarily selected indicator.

U.S. Pat. No. 9,355,387 generally describes systems and methods for real-time information sharing. A server receives, from a first user device, a request to create an event, a start time and an end time for the event, and a request to share information among a group of user devices only during a sharing duration associated with the start time and the end time. The server receives information from the respective user devices in the group during the sharing duration, and distributes the received information to the group of user devices only during the sharing duration. The distributed information comprises at least one of geographic locations of the group of user devices and imagery taken by one or more respective devices in the group during the event. After the end time, contact information related to one or more user devices in the group is distributed to other user devices in the group.

U.S. Pat. No. 9,357,350 generally describes a system for creating an anonymous social gathering of 3 or more persons. The system has a server digital device and a client digital device both operatively connected to a distributed network and thus to each other. The client device is configured to display an electronic mapping received from the server digital device through the distributed network and the electronic mapping displays at least one selectable geolocation indicator. Each geolocation indicator represents an indicated location of a gathering of at least two anonymous portable digital devices. The electronic mapping is configured to display indicator identification information on the user device for the momentarily selected indicator.

U.S. Patent Publication No. 2007/0132166 generally describes a method and resulting product of generating a bible torah or other religious text personalized to an intended recipient. The person giving the bible selects a characterization of a bible, such as a cowboy bible, truck driver's bible, lawyer's bible, children's bible, woman's bible and the like. Then the giver selects an age group of the intended recipient of the bible. Based on this information the system then presents a form for the giver to select from a list of problems experienced by said intended recipient. The giver is then given an opportunity to select additional passages from the bible or other sacred texts to be highlighted. A personalized message with sections highlighted which related to an intended recipients age and problems. This message can be a bound volume produced by the steps of feeding lightweight paper through a printer, printing using an inkjet technique or other relatively thinly deposited ink to print on said paper to result in producing printed paper, and binding said printed paper into a volume. The inventive combination may incorporate lightweight or ordinary paper in one volume of a scriptural or underlying religious text (such as the Holy Bible, the Torah, or the Qur'an) and a biographical text detailing the triumphs and hardships of the life of either a celebrated public figure or an extraordinary but seemingly every-day character. By cross-referencing these two texts, and packaging them in a single volume form where they can easily be flipped between, the teachings of a particular religious faith can be made more readily accessible to the public at large.

U.S. Patent Publication No. 2012/0005293 generally describes a system and method for processing messages being composed by a user of a computing device (e.g. a mobile device). Embodiments are described in which the performance of certain tasks is initiated before a direction is received from a user to send a message being composed by the user. This may involve, for example, "pre-fetching" security-related data that will be required in order to send a message that is in the process of being composed by the user securely. Such data may include security policy data, certificate data, and/or certificate status data, for example.

U.S. Patent Publication No. 2016/0212076 generally describes a computer-implemented method, system, and apparatus for displaying at least one prayer on at least one client device including at least one processor. The method includes receiving, at least one server computer, a share request from a first client device, the share request comprising: a selection of at least one prayer, and at least one customization option for the at least one prayer; generating, with at least one processor, the customized prayer based at least partially on the share request; and communicating the customized prayer to at least one second client device.

International Patent Publication No. WO2005114377 generally describes a method for matching an offeror and an offeree in which a searching party is presented with parameters related to an offer and a limited number of possible selections for each parameter, e.g., on a display. The searching party determines which of the possible selections are applicable to their search by actuating an input device, i.e., clicking a mouse button. A database of information in which each party is associated with their selections is created in a processor unit which compares the searching party's selections to information in the database for the same parameters of other parties having a status as offeror or offeree different from the status of the searching party as offeror or offeree and notifies the searching party when any other parties have selections which exactly match the searching party's selections. A remote interview scheduling procedure is also possible.

International Patent Publication No. WO2015050585 generally describes a method of automation and facilitation of direct product sourcing and management including: providing the system; qualifying, by the system and at least a first, a second and a third user, the users with system certification; depositing, by the system and the users, product documents having product properties in a document repository; maintaining, by the system and the users, a managed-inventory program; preparing, by the system and the users, a product auction; executing, by the system and the users, the product auction; concluding, by the system, the auction; transferring, by the system and the users, purchased product to the first user; and appraising, by the system and the users, auction user operation performance.

International Patent Publication No. WO2016141429 generally describes information systems, assemblies and funerary markers employing augmented reality for the commemoration of deceased individuals. Mobile devices are employed to decode digital tags that locate commemorative content, to map the position and geometry of a headstone, and to display the commemorative content in semantic context with the headstone. A spatial mapping module and augmented reality engine adapt the commemorative content for displaying the content in alignment with the position and geometry of the headstone.

None of the art described above addresses all of the issues that the present invention does. Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

According to an aspect of the present invention, a method is provided for organizing a quorum. The method includes requesting, using an application on an electronic device, the formation of a quorum at a predetermined geographic location, identifying a plurality of individuals within that predetermined geographic location, and sending a notification to a secondary electronic device for each of the plurality of individuals, wherein the notification notifies each of the plurality of individuals of the predetermined geolocation of the quorum.

It is an object of the present invention to provide the method for organizing the quorum, wherein the method further includes registering with the application on the electronic device, the registering includes inputting identifiable information selected from the group consisting of: name; age; location; and religion.

It is an object of the present invention to provide the method for organizing the quorum, wherein the registering further includes indicating whether a user is able to read the Torah.

It is an object of the present invention to provide the method for organizing the quorum, wherein the requesting the formation of the quorum further includes selecting a timeframe during which the quorum is to be held.

It is an object of the present invention to provide the method for organizing the quorum, wherein the requesting the formation of the quorum further includes cancelling the request for the formation of the quorum if a predetermined number of users do not indicate that they are attending the quorum at the predetermined time.

It is an object of the present invention to provide the method for organizing the quorum, wherein the predetermined number of users is 10 users.

It is an object of the present invention to provide the method for organizing the quorum, wherein the requesting the formation of the quorum further includes rescheduling the request for the formation of the quorum if a predetermined number of users do not indicate that they are attending the quorum at the predetermined time.

It is an object of the present invention to provide the method for organizing the quorum, wherein the predetermined number of users is 10 users.

It is an object of the present invention to provide the method for organizing the quorum, wherein the sending the notification to the secondary electronic device for each of the plurality of individuals further includes enabling each of the plurality of individuals to accept or reject the request.

It is an object of the present invention to provide the method for organizing the quorum, wherein the predetermined geographic location is an area surrounding a geographic location of a user requesting the formation of the quorum.

It is an object of the present invention to provide the method for organizing the quorum, wherein the identifying the plurality of individuals further includes determining whether each of the plurality of individuals meets a set of predetermined qualifications.

It is an object of the present invention to provide the method for organizing the quorum, wherein the set of predetermined qualifications includes being male, being at least 13 years of age, being non-intoxicated, being an individual who has not prayed already that day, and being of the Jewish faith.

DESCRIPTION OF THE PREFERRED EMBODIMENTS

Figure 1:
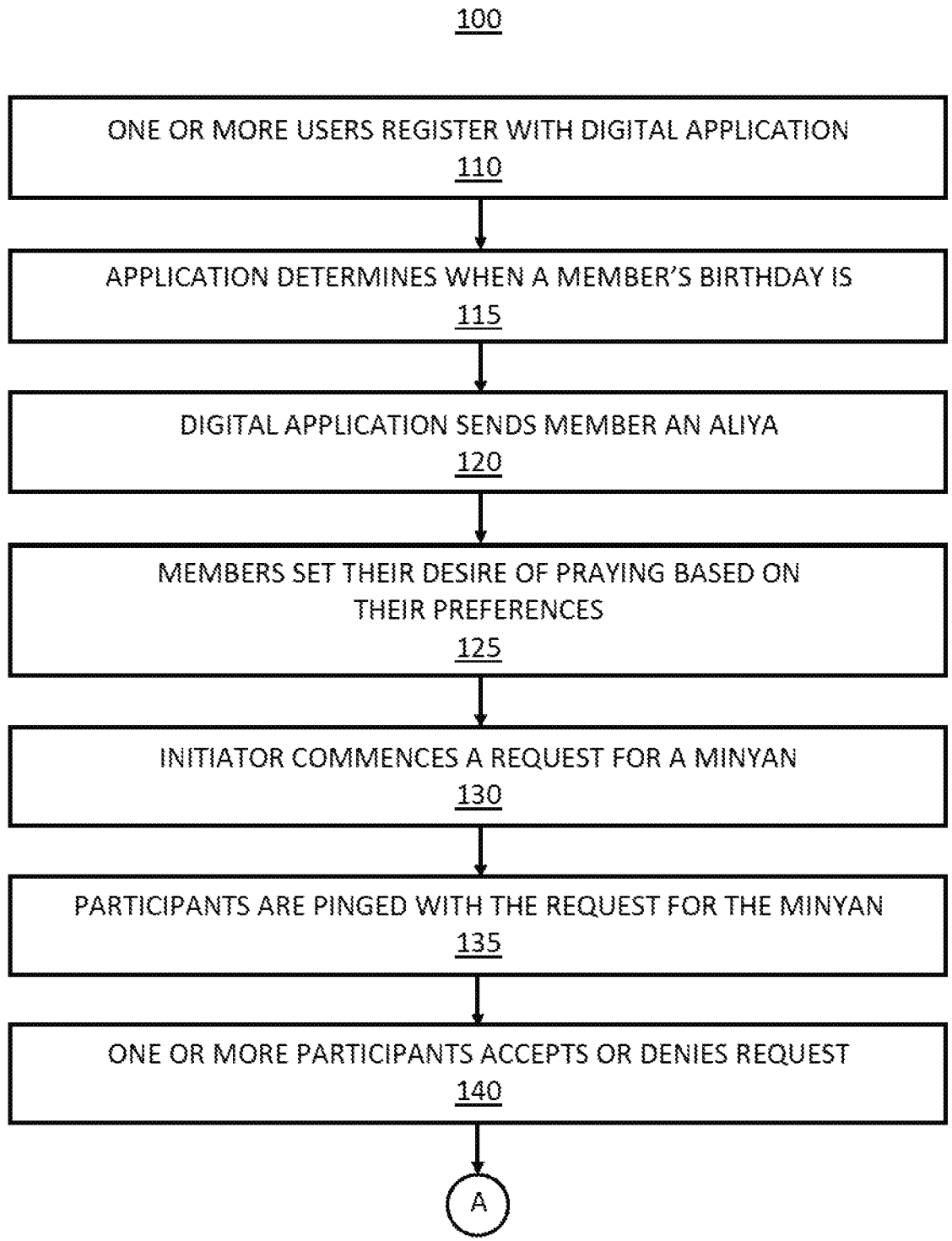
FIG. 1 show a method for determining the geographical location of one or more individuals qualified and willing to partake in a quorum, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
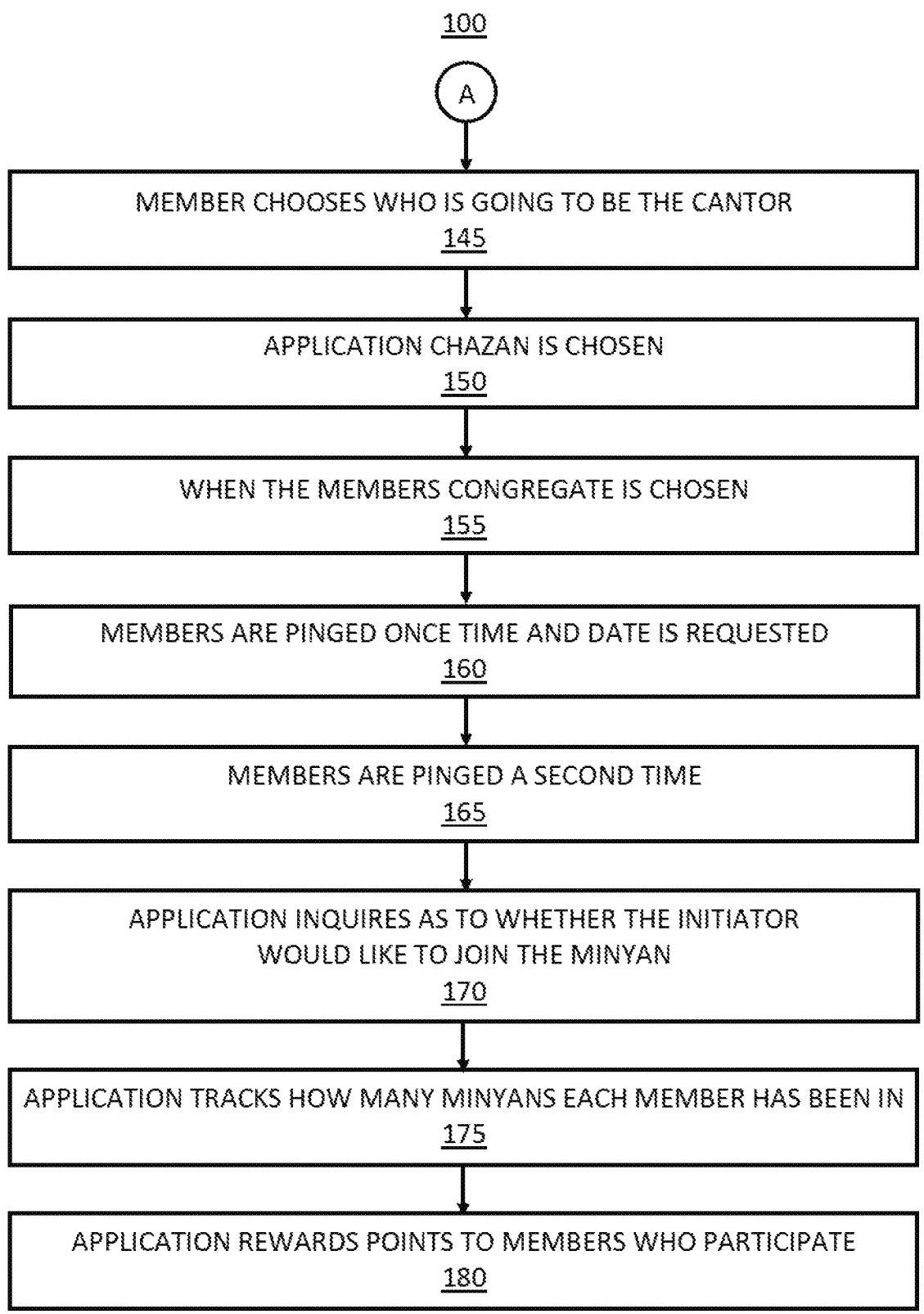
FIG. 2 show a method for determining the geographical location of one or more individuals qualified and willing to partake in a quorum, according to an embodiment of the present invention.

Referring now to FIGS. 1-2, a method 100 for determining the geographical location of one or more individuals qualified and willing to partake in a quorum (also referred to as a "Minyan") of a minimum of 10 men (of which 6 partake in praying while at least 4 more can each either pray or simply be present) in order to fulfill an obligation of daily prayers. These daily prayers may be Morning prayers, Afternoon prayers, Night prayers, or at other times when a quorum of men is needed at a certain time and place such as, e.g., a home (where mourners say kaddish), a cemetery, etc.

The qualifications for inclusion in a quorum are that each individual must be male, must be at least 13 years of age, must not be intoxicated, must have not prayed already, and must be of Jewish faith.

Figure 3:
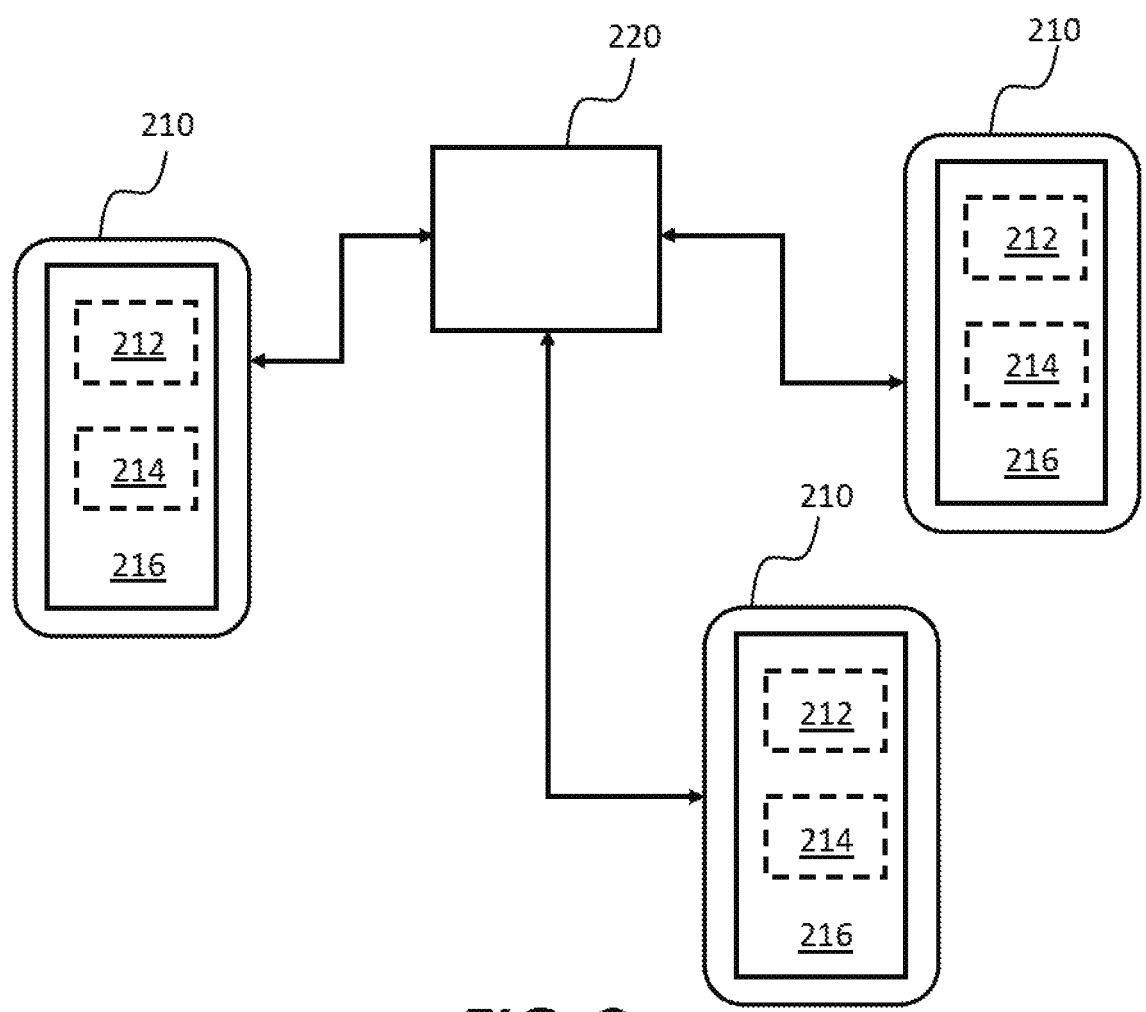
FIG. 3 shows a system for determining the geographical location of one or more individuals qualified and willing to partake in a quorum, according to an embodiment of the present invention.

At step 110, one or more users register with an application. Use of the application enables users to search for other users or be searched for by other users. According to an embodiment, the users include an initiator, and participants—collectively referred to as the Members. According to an embodiment, the user opens the application on an electronic device 210 (as shown in system 200 of FIG. 3). The electronic device 210 may be a desktop computer, a laptop computer, a tablet computer, a smart phone, and/or any other suitable electronic device. According to an embodiment, the electronic device includes a processor 212 and a memory 214. According to various embodiments, the processor 212 may be configured to perform on or more of the steps in system 100. According to an embodiment, the one or more users register using a graphical user interface 216 coupled to the electronic device 210. According to an embodiment, the electronic device 210 may be coupled to one or more remote servers 220. According to an embodiment, two or more electronic devices 210 may be able to communicate via the one or more remote servers 220.

According to an embodiment, the registration includes inputting identifiable information, such as name, age, location, and/or any other suitable information. The registration may also include inputting information related to their abilities to perform certain tasks, such as, e.g., being able to read the Torah.

Upon registering, Members may enter in their Hebrew birthday, wherein the application will calculate their bar mitzvah parsha (whether or not it's coming up, or they've already had it). According to an embodiment, the application, at step 115, determines when a Member's birthday is and, whenever it is a Member's birthday in a given week, the application, at step 120, sends that Member an aliya (a blessing over the Torah).

Members, during the registration, have already input their Hebrew full name (e.g., X son of X) so that, during Aliyah, their name is already in place for the gabai to call. Also, according to an embodiment, if there are Members who are sick, and the option is there for other members to know to pray for that sick person (Member), they will say a prayer for the sick person by the Torah.

Members are also allowed to broadcast name of the deceased for yizkor, as well as names of the sick for hashkavah for the Minyans they will join, or other Minyans that are currently underway or will be underway.

During the registration, at step 125, Members may set their desire of praying based on the customs they are geared to. For example, the Members may have the preference stating that they want the application to search for Ashkenazi, Sephardic, or Chasidic praying formats (one of the specific types). However, according to an embodiment, the application does not exclude the searcher or initiator from having a mix people in the Minyan. Meaning that, e.g., Mr. X may initiate a request for morning Praying, and in his setting he is Sephardic, but, when other Members get pinged, and if they are Ashkenazi, it asks them that the Minyan will be in a format of Sephardic tradition and if they will like to still partake (if the initiator chose that option, or it can be the option of the majority of participants if another option is chosen).

At step 130, the initiator, using the application, commences a request for a Minyan. This request causes the participants, at step 135, to be pinged with the request for the Minyan, enabling each of the participants to accept the request or decline the request (at step 140).

According to an embodiment, each Minyan formed may have a Member choose, at step 145, who is going to be the cantor (also known as a chazan) and, if no one chooses, the application, at step 150, chooses a chazan. According to an embodiment, if all Members refuse to be the chazan, the application, at step 155, chooses when the Members congregate.

According to an embodiment, the chazan is chosen at random. Additionally, according to an embodiment, if a Member was a chazan the day before, he is not selected to be a chazan the subsequent day to the day he was the chazan. Same with an aliya in the same Minyan). if two or more Members want the same aliya or want to be cantor, they can have a battle of wits based on questions the app will give them, and whomever answers correct the fastest will be awarded, or leave it for chance of the app picking.

According to an embodiment, only participants within a certain distance from a geographic location are pinged. The geographic location may be the location of the initiator or any other location chosen by the initiator. According to an embodiment, each Member has the ability to set a desired distance from which the Member is willing to be pinged, and the distance from himself that he wants to ping others.

According to an embodiment, Members may also display that they have a chiuv (obligation to say Kaddish for someone who died in their family). The app can have the name of the departed, so the gabai can say their names by the Torah. A Member can initiate as part of either joining into a Minyan or forming a new one, that they request an aliya (blessing over the Torah) or that they wish to say a blessing of Gomel.

The prayers are time sensitive (they are based on celestial events that occur during any given day), therefore, the Minyan can be set be as time sensitive. For example, the initiator can request that the Minyan is to happen by a certain time, and that, if a quorum is not found, to kill the request. This may be in anticipation of traveling outside of metropolitan areas, where there is less of a chance of a Minyan to occur. According to an embodiment, instead of killing the request, the initiator may set the application to request a Minyan at a future date and time.

According to an embodiment, the application will not work on holidays (shabbat, yom toys, etc.) but makes accommodations for future Minyanim which may fall on those holidays (or any other day). According to an embodiment, the Minyan is not bound for that day the initiator signs on to the application. In that case, Members of the application will get pinged once when the time and date is requested (at step 160), and a 2nd time (as a reminder) (at step 165), 24 hours before the Minyan service.

To ensure that other Minyans do not get diluted, initiator starts a request for a Minyan at a place and time which is within a reasonable distance to another Minyan that is occurring. If there is a Minyan within a reasonable time and distance to the Minyan that the initiator wishes to request, the application, at step 170, inquires as to whether the initiator would like to join the Minyan which is within the proximity of the initiator's Minyan and which is initiated by another Member already and combine the requests. According to an embodiment, what constitutes as a reasonable distance may be mitigated within the settings of the application.

The application recognizes two critical aspects in regard to Minyans. These aspects are: places where other Minyans have occurred repeatedly (such as a synagogue, beit midrash, etc.); and Members who have been active in praying with and in a Minyan.

According to an embodiment, the application may run in the background of the electronic device on which it is used, such that, even if there is no initiator of the Minyan, Members who congregate within a certain space and time within a certain square footage (e.g., within a 1000 sq. ft or less), the application shows that there is a Minyan formed. In the event that a group has gathered for a Minyan (either initiating through the application, or by just congregating together in one area, such as, e.g., a room) and there is less than the desired number of individuals needed to form a Minyan, the application, via the Internet, sends pulses to anyone passing by within a certain distance from the Minyan location, so that, if there is a passerby within that radius or zone of the pulse, and he can accommodate to join the Minyan in distress, he is able to join in the Minyan.

According to an embodiment, the application can recognize speech. This may be for multiple purposes, such as:

recognizing speech to indicate on the screens of the devices of Members who are not present but would like to be present, where the Minyan is in their prayers; and recognizing speech in gauging how fast the cantor is in his prayer and in the pronunciation of the prayer, and guides the cantor in their prayer (e.g., the application may indicate "You're going to fast," "You're slurring your words," "You're misreading," etc.)

The application may also recognize Members who are consistent in praying in/with a Minyan such that, when they enter an area where there are other Members, the application makes an association (or links) with them as a result of being in the same area. This enables other Members to be in trust of another able Member, and make associations, meaning that, if someone just signed up today, he ideally should not be able to initiate that Minyan without being verified. The verification comes through being in few Minyans, and certainly in consistent Minyans.

According to an embodiment, the application also tracks, at step 175, how many Minyans each Member has been in. With the association/Link with other Members, as described above, Members, when travelling, can know if there are other Members who are "trusted" and if they have ever prayed with that Member before.

The benefits for the Members are multiple other than setting up Minyans. For example, the application may have a point system and, at step 180, the application rewards points to Members who participate. The points may be accumulated and offered based on being a cantor, a participant, a baal koreh, or otherwise, and, when accumulated to a certain amount, may be used to redeem for something with the application's commercial partners.

If a Member has been a cantor multiple times, the application may gauge the prayer on a grade of 1 to 10, so that the Member would know where to fix their praying. Throughout the day, the Members may receive questions from the application which they may answer for points. According to an embodiment, the commercial partners may have advertisement space, or can join in the point system in order to entice Members to shop at their site/location. For example, Josh, after being a Member and accumulating "x" amount of points, qualifies to receive a 25% discount at Moshe's store on one item.

In a preferred embodiment of the invention, the application is started. Login and registration are required. The application can accept an individual or a personal institution as a registered user. A personal institution may be a house of worship or commercial business. The personal institution can register as an admin and control access and profile of its members. The personal institution can require email validation of its members and control access to the application. Personal information of individual users or members of an institution may include: name, User id password, email, picture of user, avatar or emoji, obligation to say kaddish (the prayer for the dead), whether the user is of Ashkenazi or Sephardic origin, Hebrew birthday, bar mitzvah parshah, profession, house of worship and other pertinent info. Once logged in, registered and verified by the application as a personal user or a house of worship, a main page is displayed.

A profile of the personal user may be displayed. The profile page lists a plurality of information such as the house of worship that the user is affiliated with, the next available prayer service and its time; search feature; and a map view which may display upcoming services sorted location and times when and where a minyan will be forming at other house of worship. Various filters are available for a user to see upcoming prayer service times within a designated range of time; to view various house of worship features and criteria such as the presence of ceremonial cleansing baths (also known as mikvas), style of prayer reading, and the denomination and sect of the congregation. The Application also allows a user to earn points to be redeemed for prizes depending on how many minyans they attend, may display advertisements and tracks other minyan participants from all congregation and house of worships so that personal users may connect socially if desired. The application may also be configured to allow for donations and charity to be given by personal users to the charity or organization of their choice.

The application contains a GPS and location feature so that when a user is near a congregation in need of completing a minyan or whose prayer service is close in time to the user's actual real time location, the application will notify the user. The application may be configured with a scheduling feature such that when a user anticipates being in a certain location and at a certain time on a certain date, the application may notify the user of a minyan or prayer service. If the minyan is complete or the prayer service is complete, then the house of worship may disable the notification feature to the user. Similarly, the personal user may also set their features to only ping or notify the user of minyans and prayer services that have not yet begun. In another embodiment, the personal user may only desire to join minyans made up of individual users that may or may not involve a house of worship. Such users can congregate in any open space and begin a prayer service. The application may be configured to only select locations that have characteristics that would allow for a plurality of individuals to gather and pray in peace. The application may be configured by the house of worship or the personal user to locate and notify users of certain faith or age in order to complete the minyan. The application may also be configured to search, locate and notify a personal user who can lead the minyan in its prayers. The application may be configured to show users when prayer shall commence, when prayers commences, how much time is left in a particular prayer service. The application will have a graphical user interface that may be configured to show not only a map view of where other users and house of worships are. The graphical user interface of the application may also display a calendar of prayer times for each of the three a day prayer services and the corresponding minyan times for a specific house of worship. The application tracks the minyans attended by a user. The application displays how many points a user has which corresponds to the number of minyans he has attended or completed. The more points a user has the more prizes or awards the user gains. These points can be redeemed for prizes or monies to be donated to charity. Similarly, a house of worship or institution may also gain points if they use the applications services. Users and institutions may redeem their points in the form of merchandise coupons. Such coupons may be offered by local businesses in exchange for advertisement on the application.

The application may be configured with various social interactions between users and users and users and house of worships, The application may be used by users to alert other minyan members to adjust certain prayer behavior during prayer services that allow for a user to have, hold and use their application on their mobile devices. Such prayer behaviors include notifying and messaging another minyan member to slow down their prayer reading, enunciate better or raise the volume of their voice. Such behaviors and user characteristics may be stored on the application and become part of the user's profile. Such comments and feedback may also be listed on a house of worships administration page for prospective minyan members to view prior to accepting entry into their prayer service.

The application may be configured to listen to prayer services through the microphone of a mobile device, Smartphone or tablets. The application may be configured to use voice recognition and provide translation or feedback on the users or of the leader of the prayer service ("the chazan"). In another embodiment, the application may be configured to gauge, measure, and record the speed, the pronunciation, and volume of the minyan, personal users and of the leader of the prayer service.

In a preferred embodiment of the application, an administrative user enters in information about the institution or House of Worship, including but not limited to, address, telephone number, administrator's email, Style of prayer reading (such as Ashkenazi, Sephardic, or Edoot Hamizrach), prayer service schedule, whether a Mikvah (ritual bathing) is present or not, announcements of celebratory occasions, funeral services, classes of all types (also known as shiurim) such as cooking classes, Language classes and camp schedules. The Rabbi or other leader of the house of worship may also be identified, as well as the administrators of the house of worship administrator page. The house of worship profile page will display exact times of the 3 prayer services in a given day, also known as morning service or Shacharit, midday services also known as mincha and evening service also knows as Ma'ariv. The application and the house of worship pages will track sunrise and sunset times which factor into prayer schedules in a given time of year. The application will also track and notify all personal users and members of the house of worship of all holiday times and any other customary and religious requirements for a given holiday.

In other embodiments, the application can be used for any activity, social or business that requires a certain amount of people to complete a task, such as looking for quorum members, looking for additional team members to complete a team sport, or needing a certain amount of volunteers to complete a task. The activity and requirements can be inputted into the application and notify any participating personal user of its requirements.

Aspects of the present invention may be used for other functions, such as, but not limited to, finding quorums of people for other purposes. For example, the application may be used to find the necessary number of members required to hold a business/corporate quorum. Furthermore, the application may determine what type of member each member is, if only certain members are required for a corporate quorum to commence.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for organizing a quorum, comprising:
    requesting, using an application on an electronic device, the application comprising a GPS feature, the formation of a quorum requiring a predetermined number of users at a predetermined geographic location and at a predetermined time;
    in response to a determination that the predetermined number of users do not indicate that they are attending the quorum at the predetermined time, cancelling and rescheduling the request;
    identifying a plurality of individuals within that predetermined geographic location using the GPS feature;
    sending a notification to a secondary electronic device for each of the plurality of individuals, wherein the notification notifies each of the plurality of individuals of the predetermined geolocation of the quorum;
    sending another notification to the secondary electronic device for each of the plurality of individuals if the quorum has not yet begun;
    enabling each of the plurality of individuals to accept or reject the request; and
    rewarding a subset of the plurality of individuals that accept the request with points through the application, wherein the points are donatable to a charity selected by an individual from the subset of the plurality of individuals.

2. The method as recited in claim 1, further comprising registering with the application on the electronic device, the registering includes inputting identifiable information selected from the group consisting of: name; age; location; and religion.

3. The method as recited in claim 2, wherein the registering further includes indicating whether a user is able to read the Torah.

4. The method as recited in claim 1, wherein the predetermined number of users is 10 users.

5. The method as recited in claim 1, wherein the predetermined number of users is 10 users.

6. The method as recited in claim 1, wherein the predetermined geographic location is an area surrounding a geographic location of a user requesting the formation of the quorum.

7. The method as recited in claim 1, wherein the identifying the plurality of individuals further includes:
    determining whether each of the plurality of individuals meets a set of predetermined qualifications.

8. The method as recited in claim 7, wherein the set of predetermined qualifications includes: being male; being at least 13 years of age; being non-intoxicated; being an individual who has not prayed already that day; and being of the Jewish faith.

9. A system for organizing a quorum, the system comprising:
    a server comprising:
        a processor, and
        a memory coupled to the processor, wherein the memory is configured to:
            prompt an individual to enter information to register with an application on an electronic device, the application comprising a GPS feature, wherein the information comprises: a name of the individual, an age of the individual, a geographic location of the individual, a religion of the individual, and whether the individual is able to read the Torah;
            receive requests, using the application, for the formation of a quorum requiring a predetermined number of users at a predetermined geographic location and during a predetermined time;
            in response to a determination that the predetermined number of users do not indicate that they are attending the quorum at the predetermined time, cancel and reschedule the request;
            identify, via the GPS feature, a plurality of individuals within that predetermined geographic location by determining whether each of the plurality of individuals meets a set of predetermined qualifications, wherein the set of predetermined qualifications comprise: being male, being at least 13 years of age, being non-intoxicated, being an individual who has not prayed already that day, and being of the Jewish faith;
            send a notification to a secondary electronic device for each of the plurality of individuals, wherein the notification notifies each of the plurality of individuals of the predetermined geolocation of the quorum;
            second another notification to the secondary electronic device for each of the plurality of individuals if the quorum has not yet begun;
            enable each of the plurality of individuals to accept or reject the request; and
            reward a subset of the plurality of individuals that accept the request with points through the application, wherein the points are donatable to a charity selected by an individual of the subset of the plurality of individuals.

10. The system as recited in claim 9, wherein the predetermined number of users is 10 users.

* * * * *